United States Patent
Lin et al.

(10) Patent No.: US 8,982,047 B2
(45) Date of Patent: Mar. 17, 2015

(54) AUTOSTEREOSCOPIC DISPLAY SYSTEM AND CONTROL METHOD THEREOF

(71) Applicant: AU Optronics Corp., Hsin-Chu (TW)

(72) Inventors: Chiung-Liang Lin, Hsin-Chu (TW); Ching-Tsun Chang, Hsin-Chu (TW); Tien-Chien Liao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 159 days.

(21) Appl. No.: 13/757,865

(22) Filed: Feb. 4, 2013

(65) Prior Publication Data
US 2014/0085182 A1 Mar. 27, 2014

(30) Foreign Application Priority Data

Sep. 25, 2012 (TW) .............................. 101135113 A (51) Int. Cl.
G09G 5/00 (2006.01)
G02B 27/22 (2006.01)
H04N 13/04 (2006.01)
G06F 3/01 (2006.01)

(52) U.S. Cl.
CPC ............ *G09G 5/003* (2013.01); *G02B 27/2214* (2013.01); *H04N 13/0409* (2013.01); *H04N 13/0475* (2013.01); *H04N 13/0477* (2013.01); *G06F 3/012* (2013.01); *G06F 3/013* (2013.01)
USPC .............................. 345/156; 345/419; 345/633

(58) Field of Classification Search
USPC ......................................................... 345/156
See application file for complete search history.

(56) References Cited

U.S. PATENT DOCUMENTS

| | | | |
|---|---|---|---|
| 8,310,524 B2 | 11/2012 | Chen | |
| 2007/0258139 A1 | 11/2007 | Tsai | |
| 2010/0315492 A1 | 12/2010 | Baik | |
| 2012/0032952 A1 | 2/2012 | Lee | |
| 2012/0120065 A1* | 5/2012 | Kim et al. | 345/419 |
| 2013/0278631 A1* | 10/2013 | Border et al. | 345/633 |
| 2013/0321246 A1 | 12/2013 | Li | |

FOREIGN PATENT DOCUMENTS

| | | |
|---|---|---|
| CN | 102378032 A | 3/2012 |
| CN | 102681185 A | 9/2012 |
| TW | 413793 | 12/2000 |
| TW | I292833 | 1/2008 |
| TW | 201000179 | 1/2010 |
| TW | 201021545 | 6/2010 |
| TW | M409872 | 8/2011 |

* cited by examiner

*Primary Examiner* — Charles V Hicks
(74) *Attorney, Agent, or Firm* — Winston Hsu; Scott Margo (57) ABSTRACT

At least one characteristic of an object is captured at a first instant and the at least one characteristic of the object is then captured at a second instant. A moving direction and a moving speed of the object are calculated according to the at least one characteristic of the object captured respectively at the first instant and the second instant. A left view image and a right view image are projected to the object and if the moving speed of the object is greater than a threshold, a center point of the left view image and the right view image deviates from a center line of the object.

17 Claims, 6 Drawing Sheets

FIG. 5

AUTOSTEREOSCOPIC DISPLAY SYSTEM AND CONTROL METHOD THEREOF

BACKGROUND

1. Technical Field

The document is related to an autostereoscopic display system control method, and more particularly, to a control method for dead zone free autostereoscopic display system.

2. Related Art

Mainstream autostereoscopic display system projects a left view image and a right view image to a user's left eye and right eye respectively so as to create a three-dimensional image perception for the user by utilizing the parallax effect.

Figure 1A:
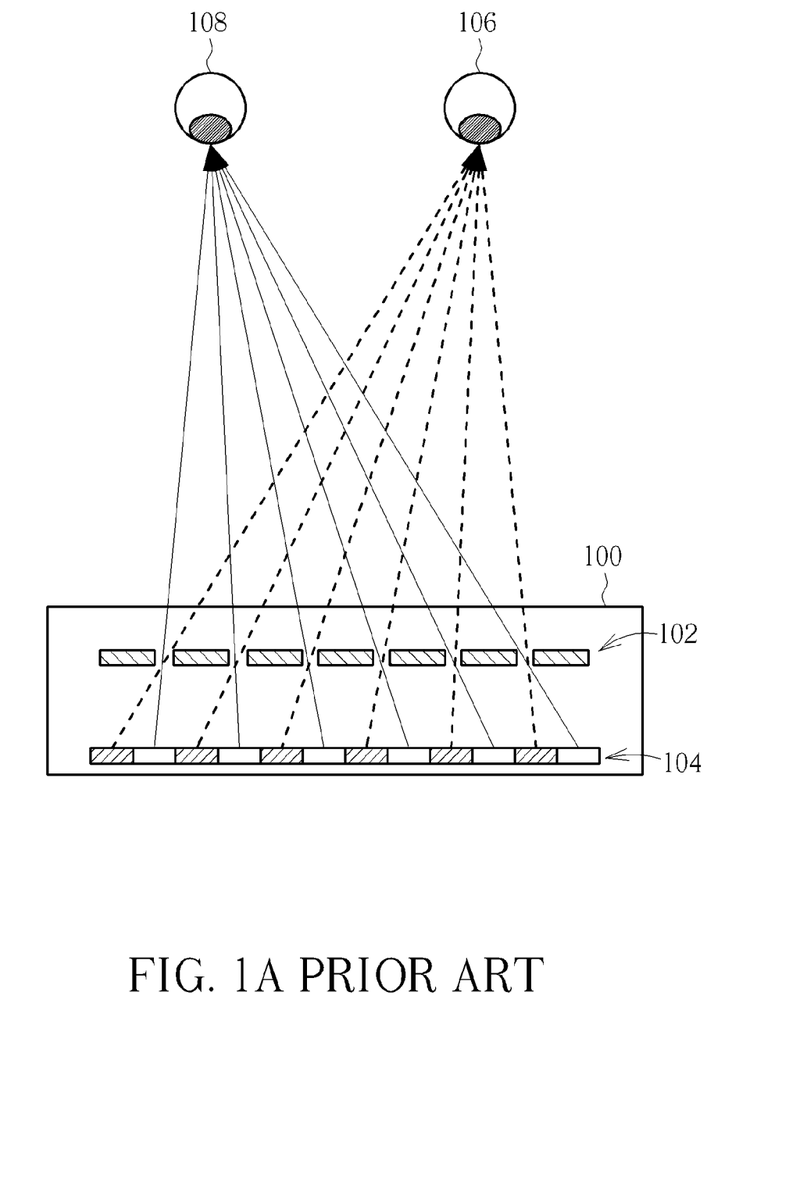
FIG. 1A is a diagram illustrating an autostereoscopic liquid crystal display module projecting an image to a user's left and right eyes.

Please refer to FIG. 1A, which is a diagram illustrating an autostereoscopic liquid crystal display (LCD) module 100 projecting an image to a user's left and right eyes. The autostereoscopic LCD module 100 may include a plurality of parallax barriers 102 and a plurality of pixels 104. The plurality of pixels 104 may be arranged interleavely, for example, light emitting from pixels 104 marked with slashed lines in the autostereoscopic LCD module 100 may go through the plurality of parallax barriers 102 to generate a left view image in the user's left eye 106, whereas light emitting from pixels 104 with no markings in the autostereoscopic LCD module 100 may go through the plurality of parallax barriers 102 to generate a right view image in the user's right eye 108. The plurality of parallax barriers 102 may adjust paths of light emitting from the plurality of pixels 104 for controlling positions where the left view image and the right view image are formed.

Figure 1B:
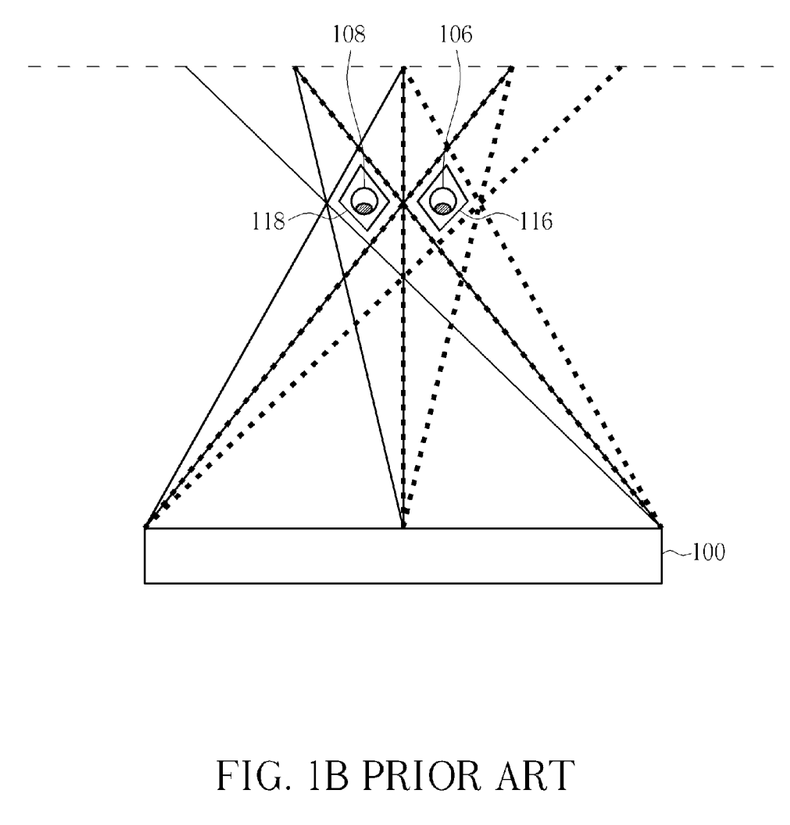
FIG. 1B is a diagram illustrating the autostereoscopic liquid crystal display module of FIG. 1A projecting an image to a user's left and right eyes.

Please refer to FIG. 1B, which is a diagram illustrating the autostereoscopic LCD module 100 of FIG. 1A projecting an image to a user's left and right eyes. Areas encompassed by solid lines are those having higher portions of the right view image projected from the pixels 104 on left, right, and center of the autostereoscopic LCD 100 module, whereas areas encompassed by dashed lines are those having higher portions of the left view image projected from the pixels 104 on left, right, and center of the autostereoscopic LCD 100 module. Rhombus areas 116 and 118 are areas having crosstalk values of the left view image and the right view image lower than a defined value, where the defined value may be 3%, 5%, 15%, and etc. Since the rhombus areas 116 and 118 belong to areas having crosstalk values lower than the defined value, the user may percept the three-dimensional image comfortably in those areas. The rhombus areas 116 and 118 are called sweet zones.

The rhombus areas 116 and 118 projected from the autostereoscopic LCD module 100 have to move with the user's eyes in order to follow the user's eyes. Since the user's eyes are quite sensitive to light intensity and color variations, if moving speed of the rhombus areas 116 and 118 is slower than movements of the user's eyes, the user's eyes may go beyond the rhombus areas 116 and 118, causing the user's eyes to be in areas having higher crosstalk value and resulting in uncomfortable feelings for the user.

SUMMARY

An embodiment of the present discloses an autostereoscopic display system control method. The method comprises capturing at least one characteristic of an object at a first instant. The at least one characteristic of the object is captured at a second instant. A moving direction of the object is determined according to the at least one characteristic of the object captured respectively at the first instant and the second instant. A left view image and a right view image are projected to the object, and a center point of the left view image and the right view image deviates from a center line of the object.

Another embodiment of the present discloses an autostereoscopic display system. The system comprises an object image capturing device, a processor, a plurality of pixels, and a plurality of parallax barriers. For example, the object image capturing device captures an object image at a first instant and a second instant. The processor calculates at least one characteristic of the object captured at the first instant and the second instant, and determines a moving direction of the object according to the at least one characteristic of the object calculated respectively at the first instant and the second instant. The plurality of parallax barriers generate a left view image and a right view image, and a center point of the left view image and the right view image deviates from a center line of the object.

These and other objectives of the present disclosure will no doubt become obvious to those of ordinary skill in the art after reading the following detailed description of the preferred embodiment that is illustrated in the various figures and drawings.

DETAILED DESCRIPTION

Figure 2:
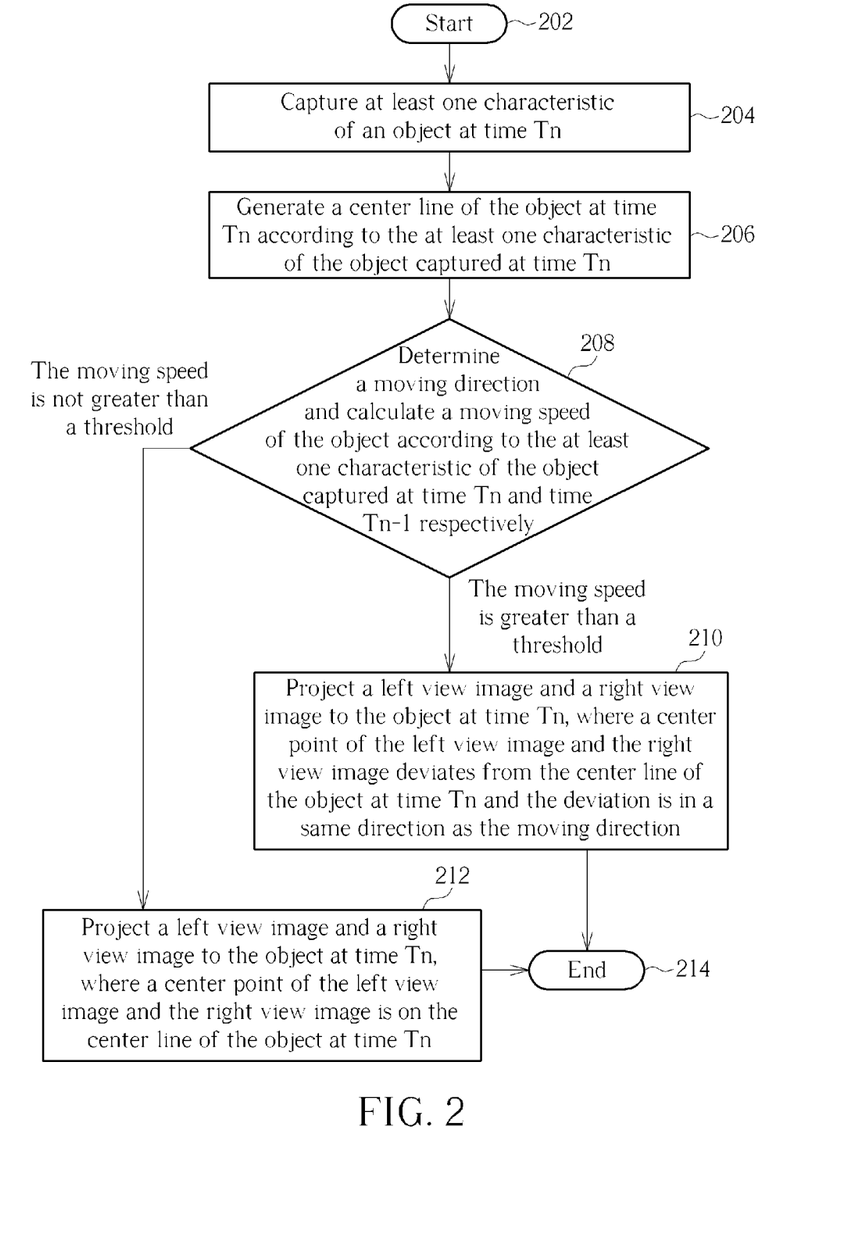
FIG. 2 is a flowchart illustrating an autostereoscopic display system control method according to an embodiment.
Figure 3:
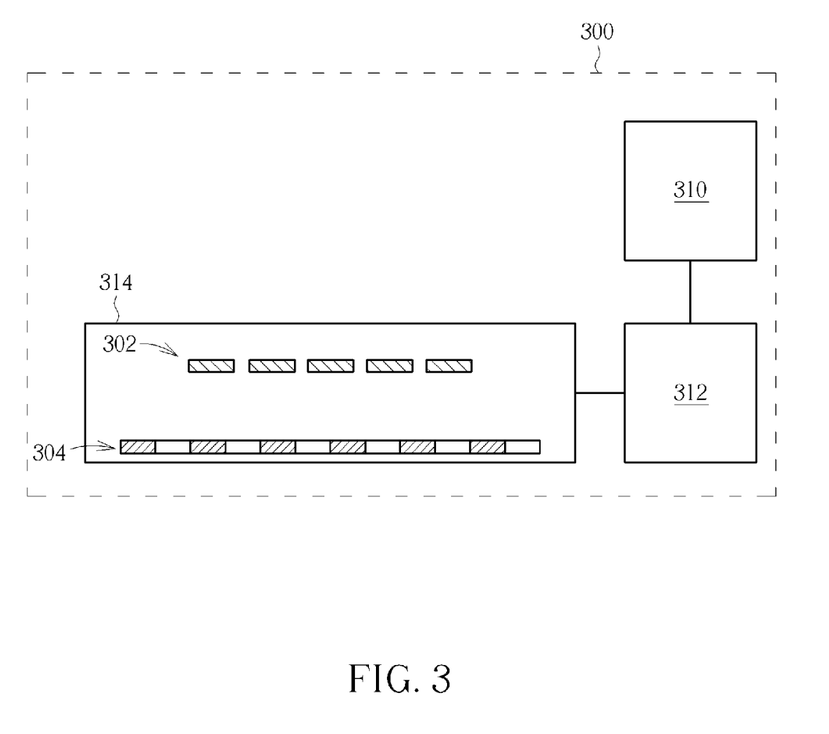
FIG. 3 is a diagram illustrating an autostereoscopic display system controlled by the method of FIG. 2.

Please refer to FIG. 2 and FIG. 3. FIG. 2 is a flowchart illustrating an autostereoscopic display system control method 200 according to an embodiment. FIG. 3 is a diagram illustrating an autostereoscopic display system 300 controlled by the method 200 of FIG. 2. The display system 300 may include an object image capturing device 310, a processor 312, and an autostereoscopic liquid crystal display (LCD) module 314. The object image capturing device 310 may be a camera (such as charge-coupled device (CCD), complementary metal oxide semiconductor (CMOS), or others), an infrared array, a sonar array, an accelerometer, or a gyroscope. The processor 312 may be a central processing unit (CPU), a micro controller unit (MCU), or an integrated circuit (IC). The autostereoscopic LCD 314 may include a plurality of pixels 304 and a plurality of parallax barriers 302. The method 200 may include the following steps:

Step 202: Begin.

Step 204: Capture at least one characteristic of an object at time Tn.

Step 206: Generate a center line of the object at time Tn according to the at least one characteristic of the object captured at time Tn.

Step 208: Determine a moving direction and calculate a moving speed of the object according to the at least one characteristic of the object captured at time Tn and time Tn−1 respectively; if the moving speed is substantially greater than a threshold, perform step 210; otherwise perform step 212.

Step 210: Project a left view image and a right view image to the object at time Tn, where a center point of the left view image and the right view image deviates from the center line of the object at time Tn and the deviation is in a same direction as the moving direction; perform step 214.

Step 212: Project a left view image and a right view image to the object at time Tn, where a center point of the left view image and the right view image is on the center line of the object at time Tn.

Step 214: End.

In the method 200, the object may be a face of a user and the at least one characteristic may be characteristics of the face such as eyes, ears, eyebrows, and/or a mouth. Step 204 may be capturing at least one characteristic of the face of the user. The following description will treat eyes of the user as the characteristic for illustrating purpose. In step 208, the threshold may be determined by the plurality of the parallax barriers 302s' efficient shift zone width at viewing plane and a frame rate of the display system 300. For example, at optimal viewing distance (OVD), the efficient shift zone width of a set of parallax barriers of the plurality of parallax barriers 302 is 0.65 cm and the frame rate of the display system 300 is 30 Hz, in such case, the threshold may be in a range between 0.5 times the width of the set of parallax barriers times the frame rate (0.5*0.65*30) and 0.7 times the width of the set of parallax barriers times the frame rate (0.7*0.65*30), which is about 9.75~13.65 cm/s. In practice, the threshold may be determined according to the design of the plurality of parallax barriers 302. A coefficient 0.5 may be a common value used in calculation of the threshold.

Figure 4:
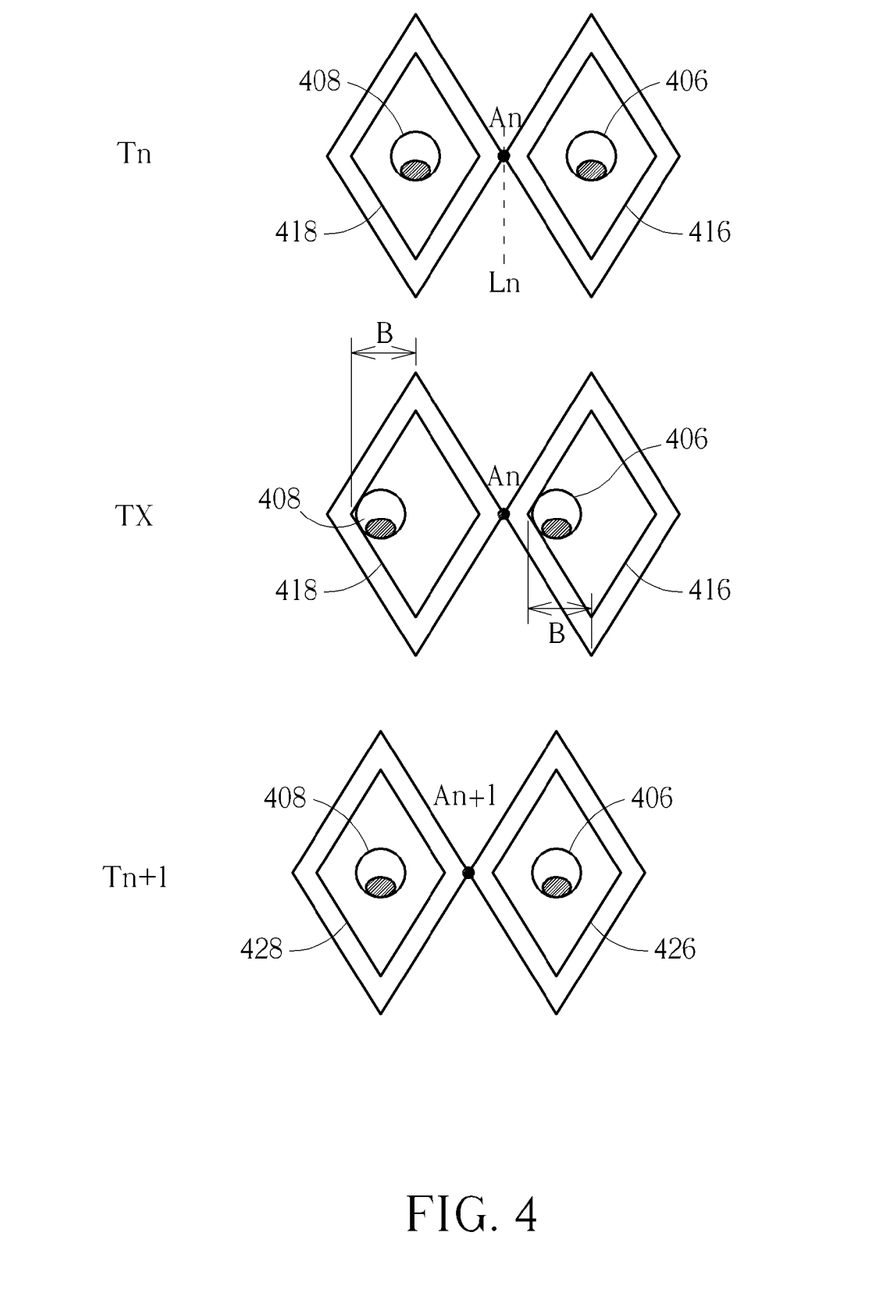
FIG. 4 is a diagram illustrating the autostereoscopic display system of FIG. 3 projecting rhombus areas to the user's left eye and right eye for demonstrating the method of FIG. 2.
Figure 5:
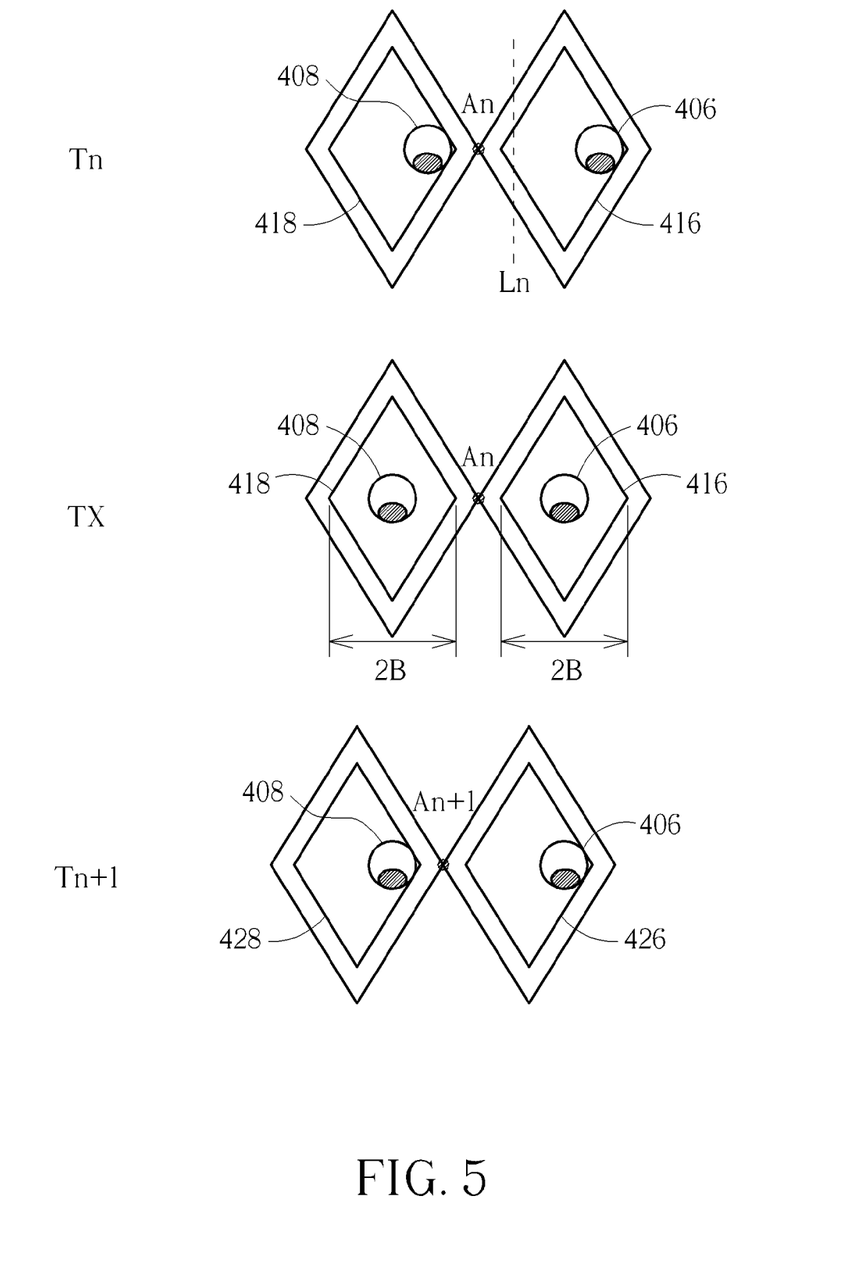
FIG. 5 is a diagram illustrating the autostereoscopic display system of FIG. 3 projecting rhombus areas to the user's left eye and right eye for demonstrating the method of FIG. 2.

FIG. 4 and FIG. 5 are diagrams illustrating the autostereoscopic display system 300 of FIG. 3 projecting rhombus areas to the user's left eye 406 and right eye 408 for demonstrating the method 200 of FIG. 2. In FIG. 4 and FIG. 5, rhombus areas 416 and 426 are left view image sweet zones (viewing zones) for the left eye 406 and rhombus areas 418 and 428 are right view image sweet zones for the right eye 408. The rhombus areas 416 and 418 are areas where crosstalk value is lower than a defined value (the defined value may be 3%, 5%, 15%, and etc.). Areas outside the rhombus areas 416 and 418 are dead zones.

All embodiments of the present disclosure are based on a situation in which the user is located at an optimal viewing distance, and a moving distance of the sweet zones is a distance between two points on a viewing plane, not a closest distance between two straight lines. In addition, illustrations of all embodiments are based on a condition that the eyes move rightward. The method of the present disclosure is not limited thereto, and may be applied to other embodiments such as the user is located at different viewing distances, the eyes move leftward, the eyes move toward all other possible directions, or when the eyes are moving.

Please refer to FIG. 3. The object image capturing device 310 captures an image of the eyes of the user at the first time Tn−1 and transmits the image to the processor 312 for processing. The processor 312 calculates the at least one characteristic of the object captured at the first time Tn−1. The object image capturing device 310 captures an image of the eyes of the user at the second time Tn again and transmits the image to the processor 312 for processing. The processor 312 calculates the at least one characteristic of the object captured at the second time Tn. The processor 312 then determines the moving direction and calculates the moving speed of the eyes.

Please refer to FIG. 4. If the moving speed of the eyes is not substantially greater than the threshold, the autostereoscopic LCD module 314 projects the left view image sweet zone 416 and the right view image sweet zone 418 to the eyes of the user at the second time Tn and a center point An of the left view image sweet zone 416 and the right view image sweet zone 418 is on a center line Ln of the eyes 406 and 408 at the second time Tn.

If image feedback among the object image capturing device 310, the processor 312, and the autostereoscopic LCD module 314 has not completed when the eyes of the user move rightward during period Tx, a buffer distance B between the left eye 406 and an edge of the left view image sweet zone 416 and between the right eye 408 and an edge of the right view image sweet zone 418 is enough for the eyes of the user to move during period Tx without going outside the edge of the sweet zones and entering dead zones.

The object image capturing device 310 captures an image of the eyes of the user at a third time Tn+1 again and transmits to the processor 312 for processing. After recalibrating the eye positions, the autostereoscopic LCD module 314 projects the left view image sweet zone 426 and the right view image sweet zone 428 to the eyes of the user at the third time Tn+1. The left view image sweet zone 426 and the right view image sweet zone 428 have a center point An+1 at the third time Tn+1. The way of projection depends on how fast the at least one characteristic moves during the second time Tn and the third time Tn+1.

In FIG. 4, the moving speed of the eyes of the user is not substantially greater than the threshold, thus the buffer distance B is enough for the eyes of the user to move during period Tx without going outside the edge of the sweet zones and entering dead zones, that is, the sweet zones move fast enough to follow the eyes.

Please refer to FIG. 5. FIG. 5 illustrates locations of the eyes and the sweet zones from top to bottom at different times. If the moving speed of the eyes is substantially greater than the threshold, the autostereoscopic LCD module 314 projects the left view image sweet zone 416 and the right view image sweet zone 418 to the eyes of the user at the second time Tn and the center point An of the left view image sweet zone 416 and the right view image sweet zone 418 deviates from the center line Ln of the eyes 406 and 408 at the second time Tn, making the left eye 406 and the right eye 408 be close to the edges of the left view image sweet zone 416 and the right view image sweet zone 418 respectively.

If image feedback among the object image capturing device 310, the processor 312, and the autostereoscopic LCD module 314 has not completed when the eyes of the user move rightward during period Tx, a buffer distance 2B between the left eye 406 and the edge of the left view image sweet zone 416 and between the right eye 408 and the edge of the right view image sweet zone 418 is big enough for the eyes of the user to move during period Tx without going outside the edge of the sweet zones and entering dead zones.

The object image capturing device 310 captures an image of the eyes of the user at the third time Tn+1 again and transmits to the processor 312 for processing. After recalibrating the eye positions, the autostereoscopic LCD module 314 projects the left view image sweet zone 426 and the right view image sweet zone 428 to the eyes of the user at the third time Tn+1. The left view image sweet zone 426 and the right view image sweet zone 428 have a center point An+1 at the third time Tn+1. The way of projection depends on how fast the at least one characteristic moves during the second time Tn and the third time Tn+1.

In this way, the buffer distance 2B between the left eye 406 and the edge of the left view image sweet zone 416 and between the right eye 408 and the edge of the right view image sweet zone 418 is increased to be 2B so that a maximum distance the eyes may move without going outside the edge of the sweet zones is the buffer distance 2B. In FIG. 5, the moving speed of the eyes of the user is substantially greater than the threshold, thus increasing the buffer distance to be 2B may ensure that the eyes of the user may not go outside the edge of the sweet zones and enter dead zones during period Tx. That is, the sweet zones may still move fast enough to follow the eyes.

In another embodiment, the processor 312 further determines a moving distance of the eyes according to the at least one characteristic calculated at the first time Tn−1 and the second time Tn respectively. The distance that the center point An deviates from the center line Ln increases as the moving distance or the moving speed of the eyes.

In all aforementioned embodiments, the processor 312 may utilize a variety of methods well known to those skilled in the art to determine if the eyes are moving and the moving direction of the eyes. For example, Kalman filter or deviation amount of two consecutive frames may be used to eliminate the possibility that the sweet zones move in the opposite direction from the eye movement.

In another embodiment, moving directions of a plurality of characteristics may be captured in order to judge if a number of characteristics moving toward a first direction is bigger than a number of characteristics moving toward a second direction. The same method may be used to judge if the eyes are moving toward the second direction different from the first direction. For example, if the number of the characteristics moving toward the second direction is bigger than the number of the characteristics moving toward the first direction and the number of the characteristics moving toward the first direction is close to zero, the eyes are considered to move toward the second direction. If the number of the characteristics moving toward the second direction is close to the number of the characteristics moving toward the first direction, the eyes are considered to move slower than the threshold.

In summary, the embodiments of the present disclosure provide a method to increase the buffer distance between the eyes of the user and the edges of the sweet zones of the left view image and the right view image. Thus when the eyes move quickly toward one direction, the sweet zones may move fast enough to follow the eyes so as to prevent the eyes from going outside the sweet zones and entering the dead zone, thereby keeping the eyes in comfortable viewing zones at all times.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An autostereoscopic display system control method comprising:
    capturing at least one characteristic of an object at a first instant;
    capturing the at least one characteristic of the object at a second instant;
    determining a moving direction of the object according to the at least one characteristic of the object captured respectively at the first instant and the second instant;
    calculating a moving speed of the object according to the at least one characteristic of the object captured respectively at the first instant and the second instant; and
    projecting a left view image and a right view image to the object, a center point of the left view image and the right view image deviating from a center line of the objects;
    wherein when the moving speed of the object is greater than a threshold, the threshold being determined by parallax barriers' efficient zone width on viewing plane and a frame rate of the autostereoscopic display system, the center point of the left view image and the right view image deviates from the center line of the object and the deviation is in a same direction as the moving direction.

2. The method of claim 1, wherein when the moving speed of the object is not greater than the threshold, the center point is on the center line.

3. The method of claim 1, further comprising:
    calculating a moving distance of the object according to the at least one characteristic of the object captured respectively at the first instant and the second instant.

4. The method of claim 3, wherein a distance between the center point and the center line increases as the moving distance increases.

5. The method of claim 1, wherein projecting the left view image and the right view image to the object is through a plurality of parallax barriers disposed in the autostereoscopic display system.

6. The method of claim 1, wherein the object is a face of a user.

7. The method of claim 1, wherein the at least one characteristic of the object is eyes and/or eyebrows of a user.

8. The method of claim 1, wherein the at least one characteristic of the object is ears and/or a mouth of a user.

9. An autostereoscopic display system comprising:
    an object image capturing device for capturing an object image at a first instant and capturing the object image at a second instant;
    a processor electrically connected to the object image capturing device for calculating at least one characteristic of the object captured at the first instant, calculating the at least one characteristic of the object captured at the second instant, determining a moving direction of the object according to the at least one characteristic of the object calculated respectively at the first instant and the second instant, and calculating a moving speed of the object according to the at least one characteristic of the object calculated respectively at the first instant and the second instant;
    a plurality of pixels; and
    a plurality of parallax barriers for adjusting light emitting from the plurality of pixels to generate a left view image and a right view image, a center point of the left view image and the right view image deviating from a center line of the object;
    wherein when the moving speed of the object is greater than a threshold, the threshold being determined by parallax barriers' shifting zone width on the viewing plane and a frame rate of the autostereoscopic display system, the center point of the left view image and the right view image deviates from the center line of the object and the deviation is in a same direction as the moving direction.

10. The autostereoscopic display system of claim 9, wherein when the moving speed of the object is not greater than the threshold, the center point is on the center line.

11. The autostereoscopic display system of claim 9, wherein the processor further calculates a moving distance of the object according to the at least one characteristic of the object calculated respectively at the first instant and the second instant.

12. The autostereoscopic display system of claim 11, wherein a distance between the center point and the center line increases as the moving distance increases.

13. The autostereoscopic display system of claim 9, wherein the object is a face of a user.

14. The autostereoscopic display system of claim 9, wherein the at least one characteristic of the object is eyes and/or eyebrows of a user.

15. The autostereoscopic display system of claim 9, wherein the at least one characteristic of the object is ears and/or a mouth of a user.

16. The autostereoscopic display system of claim 11, wherein a distance between the center point and the center line increases as the moving speed increases.

17. An autostereoscopic display system control method comprising:
- capturing at least one characteristic of an object at a first instant;
- capturing the at least one characteristic of the object at a second instant;
- determining a moving direction of the object according to the at least one characteristic of the object captured respectively at the first instant and the second instant;
- calculating a moving speed of the object according to the at least one characteristic of the object captured respectively at the first instant and the second instant; and
- projecting a left view image and a right view image to the object, a center point of the left view image and the right view image deviating from a center line of the object;
- wherein when the moving speed of the object is not greater than the threshold, the center point is on the center line.

* * * * *